United States Patent
Hsieh

(10) Patent No.: US 7,419,172 B2
(45) Date of Patent: Sep. 2, 2008

(54) KNUCKLE ARM FOR VEHICLES

(75) Inventor: Shih-Hua Hsieh, Jhuci Township, Chiayi County (TW)

(73) Assignee: Shine Far Metal Industry Co., Ltd., Taoyuan County (TW)

( * ) Notice: Subject to any disclaimer, the term of this patent is extended or adjusted under 35 U.S.C. 154(b) by 385 days.

(21) Appl. No.: 11/231,957

(22) Filed: Sep. 21, 2005

(65) Prior Publication Data
US 2007/0063472 A1    Mar. 22, 2007

(51) Int. Cl.
*B62D 7/18*    (2006.01)
*B62D 7/20*    (2006.01)

(52) U.S. Cl. ............... 280/93.512; 280/93.51; 280/93.511; 280/99

(58) Field of Classification Search ............ 280/93.51, 280/93.511, 93.512, 99; *B62D 7/20, 7/18*
See application file for complete search history.

(56) References Cited

U.S. PATENT DOCUMENTS

| | | | |
|---|---|---|---|
| 3,361,439 A * | 1/1968 | Olson | 280/43.1 |
| 6,179,308 B1 * | 1/2001 | Mielauskas et al. | 280/93.512 |
| 6,398,240 B1 * | 6/2002 | Taylor | 280/93.512 |
| 6,402,169 B1 * | 6/2002 | Schafer et al. | 280/93.512 |
| 6,513,818 B1 * | 2/2003 | Seuser et al. | 280/93.512 |
| 6,618,965 B1 * | 9/2003 | Schultz et al. | 37/232 |
| 6,860,498 B2 * | 3/2005 | McGaughy | 280/93.51 |
| D504,363 S * | 4/2005 | McGaughy | D12/160 |
| 6,902,176 B2 * | 6/2005 | Gottschalk | 280/93.512 |
| 6,932,366 B2 * | 8/2005 | Jones et al. | 280/86.751 |

* cited by examiner

*Primary Examiner*—Christopher Ellis
*Assistant Examiner*—Jacob Meyer
(74) *Attorney, Agent, or Firm*—Alan Kamrath; Kamrath & Associates PA

(57) ABSTRACT

A knuckle arm includes a body having a bearing hole. A first connection plate extends from a rear end of one of two sides thereof so as to be connected with a brake pump. Two protrusions extend from a front end of the body, and two second connection plates are connected to the two protrusions such that a pull rod is removably connected to either of the two second connection plates. Two connection boards extend from two ends of the front end of the body, with each connection board having a hole for receiving joints of the upper and lower control arms. The knuckle arm can be used for right and left wheels, and the length of the pull rod can be optionally connected thereto.

2 Claims, 5 Drawing Sheets

KNUCKLE ARM FOR VEHICLES

FIELD OF THE INVENTION

The present invention relates to a knuckle arm which can be used for both right and left wheels and where the pull rod of the knuckle arm can be replaced individually.

BACKGROUND OF THE INVENTION

A conventional knuckle arm 30 for vehicles is shown in FIG. 5 and generally includes a bearing hole 31 defined in a radial direction thereof. The bearing on a drive shaft is received in the bearing hole 31, and a wheel 32 is connected to the drive shaft. A pull rod 33 integrally extends from the knuckle arm 30 so as to turn the wheel 32. A connection hole 34 is defined in the knuckle arm 30 and located beside the bearing hole 31 so that a joint 35 on a control arm is pivotably connected thereto. However, because the pull rod 33 is integral with the body of the knuckle arm 30, the orientation of the pull rod 33 relative to the body of the knuckle arm 30 is strictly limited when connecting the wheel 32 on different positions of the vehicle. In other words, the length of the pull rod 33 and the direction that the pull rod 33 extends for front and rear wheels are different. This requires different sets of molds to manufacture these knuckle arms 30. Further, some brands of vehicles are front drive vehicles, and some are rear drive vehicles. Thus, the positions of the bearing holes 31 may vary according to the vehicles.

The present invention intends to provide a knuckle arm that can be used for both left and right wheels and where the pull rod is removably connected to the knuckle arm so that the cost of the mold for manufacturing the knuckle arms can be reduced.

SUMMARY OF THE INVENTION

The present invention relates to a knuckle arm which includes a body with a bearing hole and a first connection plate extending from a rear end of one of two sides thereof so as to be connected to a brake pump. Two protrusions extend from a front end of the body, and two second connection plates are connected to the two protrusions so that a pull rod is connected to one of the second connection plates. Two connection boards extend from two ends of the front end of the body. Each connection board has a hole defined therethrough so that an upper control arm and a lower control arm are respectively and pivotably connected thereto.

The primary object of the present invention is to provide a knuckle arm for vehicles where the pull rod can be removably connected to the knuckle arm and the knuckle arm can be used for right and left wheels.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
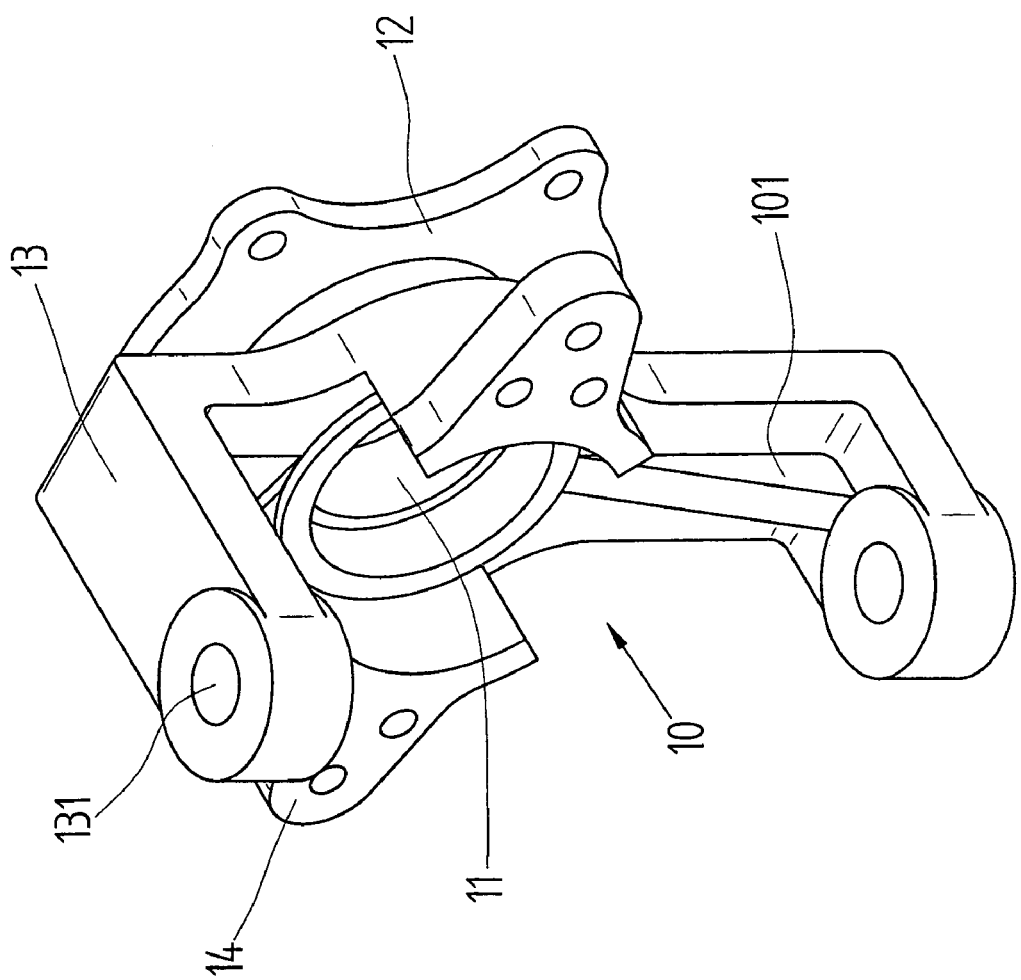
FIG. 1 is a perspective view to show the knuckle arm of the present invention.
Figure 2:
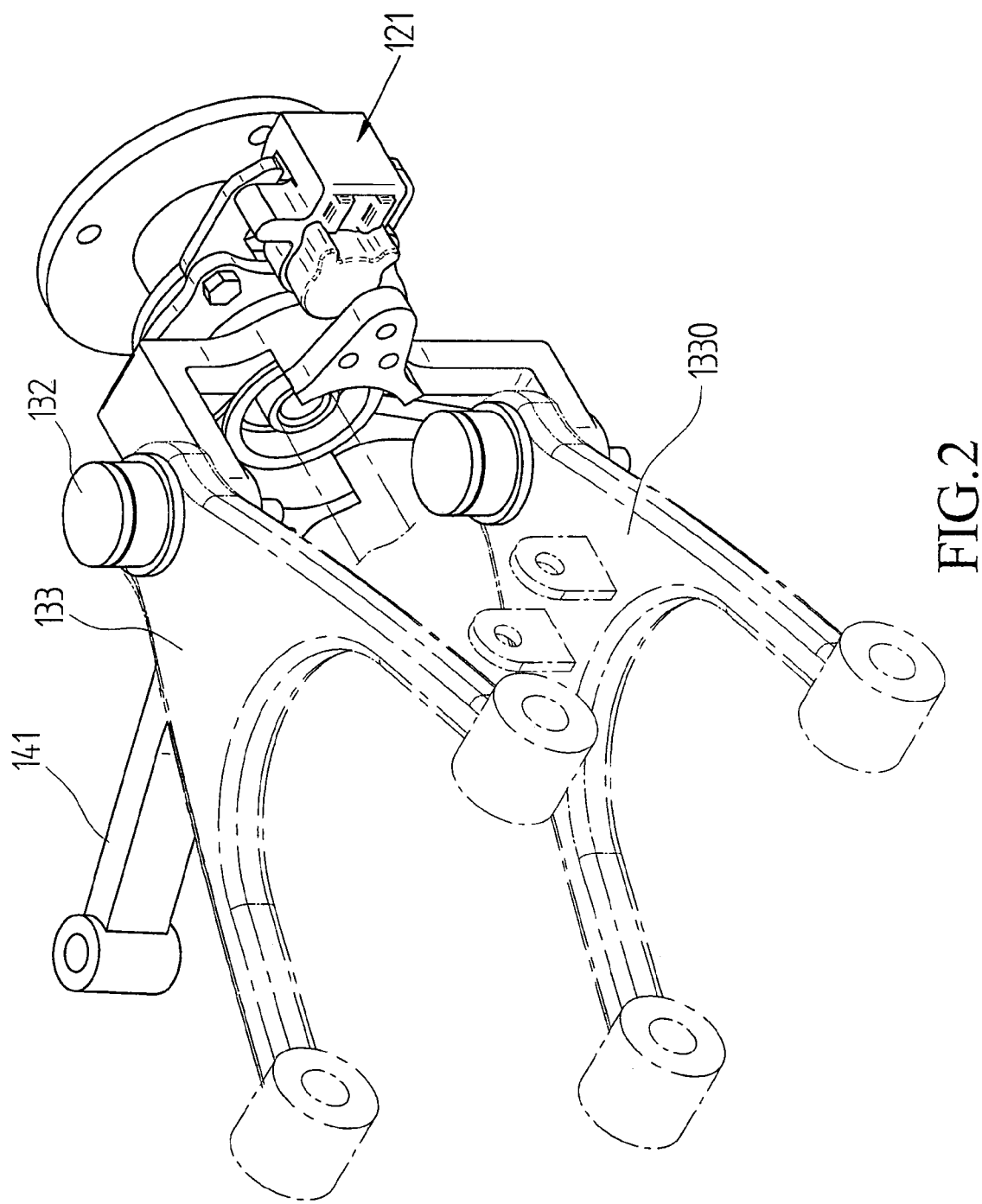
FIG. 2 is a perspective view to show the knuckle arm of the present invention connected with two control arms and brake pump.
Figure 3:
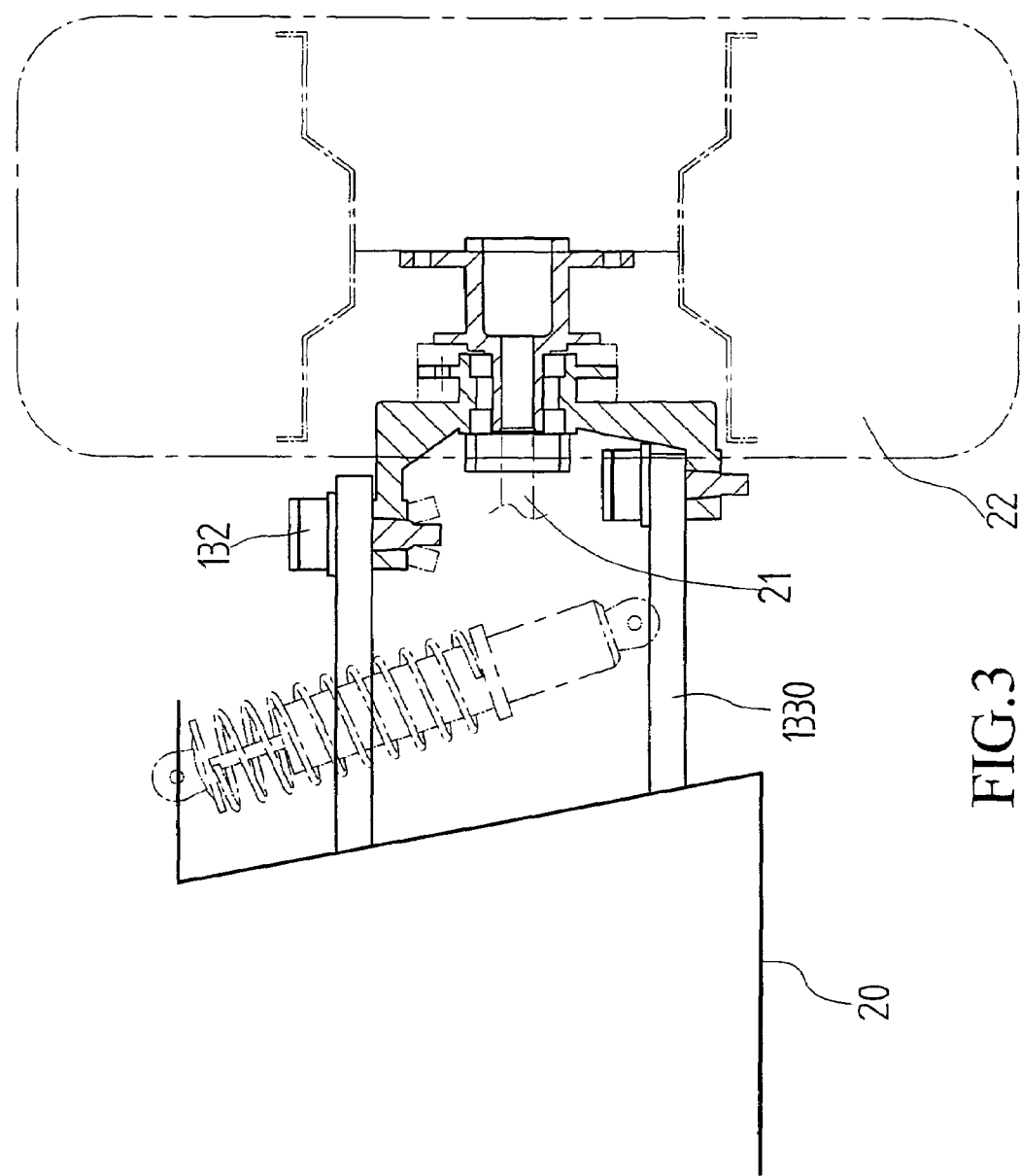
Fig. 3 is a cross sectional view to show the knuckle arm of the present invention connected to a wheel and the vehicle frame.
Figure 4:
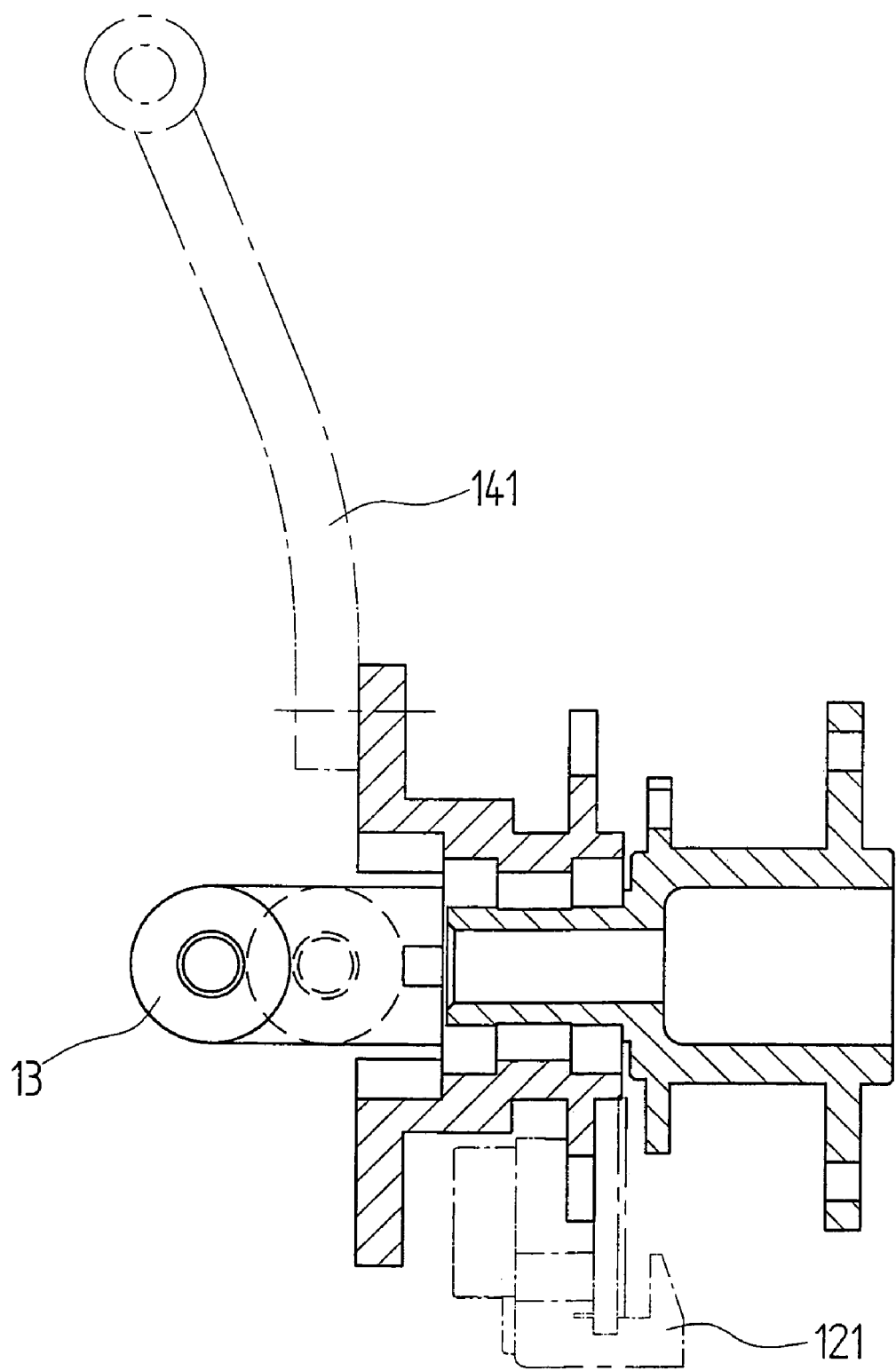
FIG. 4 is a top cross sectional view of the knuckle arm of the present inventions.
Figure 5:
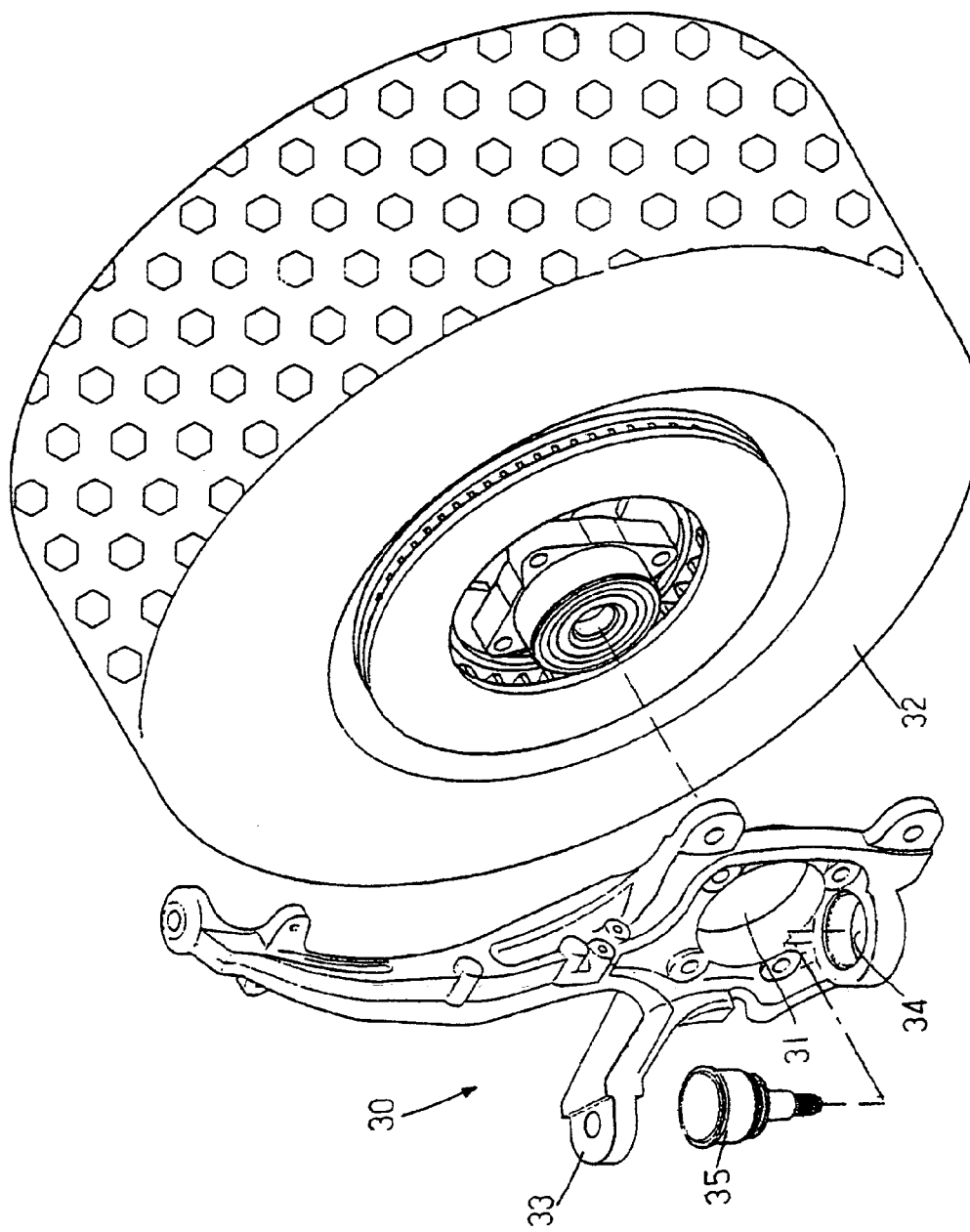
FIG. 5 shows a conventional knuckle arm and a wheel.

Referring to FIGS. 1 to 4, the knuckle arm of the present invention includes a body 10 having a bearing hole 11 so as to receive a bearing on the drive shaft 21 which is connected to a wheel 22. A first connection plate 12 extends from a rear end of one of two sides thereof, and a brake pump 121 can be connected thereto. Two protrusions extend from a front end of the body 10, and two second connection plates 14 are connected to the two protrusions. A pull rod 141 is removably connected to either of the two second connection plates 14. The pull rod 141 is made individually so that the length of the pull rod 141 can be decided when assembling the pull rod 141 to the knuckle arm.

Two connection boards 13 extend from two ends of the front end of the body 10, and each connection board 13 has a hole 131 defined therethrough. An upper control arm 133 and a lower control arm 1330 each have a joint 132 which are engaged with the hole 131 in the two connection boards 13. A suspension device is connected between the frame 20 of the vehicle and the lower control arm 1330. A reinforcement plate 101 is connected between a periphery of the bearing hole 11 and one of the connection boards 13 to reinforce the structural strength of the knuckle arm.

Because the pull rod 141 can be connected to either of the two second connection plates 14 of the knuckle arm, the knuckle arm can be used for either the right wheel or the left wheel. The brake pump 121 can be connected to the first connection plate 12 at any of the four knuckle arms of the four wheels so that there is no direction limitation when using the knuckle arms.

While we have shown and described the embodiment in accordance with the present invention, it should be clear to those skilled in the art that further embodiments may be made without departing from the scope of the present invention.

What is claimed is:

1. A knuckle arm comprising:
    a body having a bearing hole defined therethrough, a first connection plate extending from a rear end of one of two sides of the body, two protrusions extending from a front end of the body and two second connection plates connected to the two protrusions and located respectively on the two sides of the body, with the bearing hole located intermediate the two second connection plates and the two sides, and two connection boards extending from two ends of the front end of the body, with each connection board having a hole defined therethrough, with the bearing hole located intermediate the two connection boards and the two ends, with the two second connection plates located respectively on two sides of the two connection boards.

2. The knuckle arm as claimed in claim 1, wherein a reinforcement plate is connected between a periphery of the bearing hole and one of the connection boards.

\* \* \* \* \*